United States Patent [19]

Van de Poel et al.

[11] Patent Number: 6,061,091
[45] Date of Patent: May 9, 2000

[54] DETECTION OF AND CORRECTION FOR SPECULAR REFLECTIONS IN DIGITAL IMAGE ACQUISITION

[75] Inventors: Koen Van de Poel; Earle Stokes, both of Berchem; Nick Geybels, Wilrijk, all of Belgium

[73] Assignee: Agfa Gevaert N.V., Mortsel

[21] Appl. No.: 08/861,929

[22] Filed: May 22, 1997

Related U.S. Application Data

[60] Provisional application No. 60/025,121, Aug. 30, 1996.

[30] Foreign Application Priority Data

May 30, 1996 [EP] European Pat. Off. ............. 96201503

[51] Int. Cl.$^7$ ..................... H04N 5/217; H04N 5/202; H04N 5/238
[52] U.S. Cl. .................. 348/241; 348/254; 348/364; 358/522; 382/170; 382/171
[58] Field of Search ................. 378/98.7, 98.8, 378/98.11; 358/522; 348/254, 364, 241; 382/170, 171

[56] References Cited

U.S. PATENT DOCUMENTS

| 4,662,380 | 5/1987 | Riley ........................................ 128/660 |
| 4,984,071 | 1/1991 | Yonezawa ................................. 358/80 |
| 5,053,888 | 10/1991 | Nomura .................................... 358/458 |
| 5,123,060 | 6/1992 | Cho et al. ................................. 382/51 |
| 5,387,930 | 2/1995 | Toh . | |
| 5,751,844 | 5/1998 | Bolin et al. ............................. 382/156 |

FOREIGN PATENT DOCUMENTS

| 0 335 419 | 10/1989 | European Pat. Off. . |
| 0 691 627 | 1/1996 | European Pat. Off. . |
| WO 92/05509 | 4/1992 | WIPO . |

*Primary Examiner*—Wendy Garber
*Assistant Examiner*—Eric Ferguson
*Attorney, Agent, or Firm*—Robert A. Sabourin; Edward L. Kelley

[57] ABSTRACT

Image processing parameters for gradation correction of a digital image from a scene, which includes specular reflections may be seriously influenced by the presence of those specular reflections. Therefore, a method is developed to detect the presence of specular reflections in a scene, to modify the exposure time of the photo-sensitive means, which converts a luminous image to electronic image signals and to apply a gradation correction to the image data thus acquired. In one embodiment a digital camera is used to capture the image data, a cumulative histogram is built and two characteristic cumulative frequencies are used to determine via the histogram specular densities and highlight densities. The relative position of these density values indicates whether specular reflections are present, and give suitable parameters for setting an optimal exposure time and for computing a gradation correction curve.

18 Claims, 4 Drawing Sheets

DETECTION OF AND CORRECTION FOR SPECULAR REFLECTIONS IN DIGITAL IMAGE ACQUISITION

This application claims benefit of Provisional Application No. 60/025,121, filed Aug. 30, 1996.

FIELD OF THE INVENTION

The present invention relates to devices and methods for detection of specular reflections in real life scenes or on hard copy images. More specifically the invention is related to gradation correction of digital images acquired by a digital camera from a scene, comprising small specular reflection zones.

BACKGROUND OF THE INVENTION

When capturing photographic shots of an illuminated scene by an electronic camera, specular reflections of the lighting in heavily reflective objects to be photographed may occur in the image area or region of interest. Especially round objects, such as bottles, couch-work of a car and exhaust pipes of cars or motor-cycles may cause small, very bright spots, by reflection of studio lamps. The brightness (expressed in lumen/(steradian.m$^2$)) of such spots may be up to eight times higher than the brightest surface, which diffuses the light of the lighting. A specular reflecting object may be seen as an object that reflects more light than a white object. It has been experienced that about one third of the camera shots are affected by specular reflection. Specular reflection in planar objects may be avoided by slightly moving or rotating the object. For curved or round objects however, such as bottles, pipes, spherical or cylindrical objects, it may be very difficult or impossible to move or rotate the object such that specular reflections are totally eliminated. Alternatively, specular reflections may be diminished by application of an anti-reflective coating to the specular objects, but this requires various skills from the photographer and is rather time consuming. Placing shades to prevent glare from shiny surfaces may be too cumbersome.

Specular reflections are especially a problem in digital photography, where a digital camera is used for acquisition of an image from a scene. Even if lighting conditions are selected such that lights are positioned to give equal illumination across the entire scene, lighting the scene may result in specular glare from the lights. It is hard to avoid that a spherical or cylindrical object has a glare portion causing specular reflection highlights by illumination from the various light sources. A highlight is a bright area in an image. Highlights can either be caused by a diffuse reflection or a specular reflection. By specular reflection, the lighting ratio may be severely disturbed. The lighting ratio is the ratio of the illumination in the darkest shadows—at least, those that are intended to represent visible details—to the brightest highlights. Usually, the equivalent of 4½ f-stops difference in illumination is visible in image reproductions. f-Stops or f-numbers are commonly known as numbers that appear on the barrel of a lens and represent the different sizes of aperture available.

The aperture is the circular opening or diaphragm within the lens that determines the amount of light allowed to pass through to reach the photosensitive film or elements. A small aperture corresponds to a large f-stop number, for greater depth of field. The depth of field is the distance of acceptably sharp focus extending both in front of and behind the point of true focus. It varies, depending on the aperture selected, the focal length of the lens and the focal distance. A smaller aperture, shorter focal length or increased focal distance increases the depth of field. Experienced photographers have a good idea of the required aperture for a given distance of the scene and a distance variation within the scene.

Moving the aperture ring up one stop (for example from f/4 to f/5.6) makes the aperture smaller and halves the amount of light passing through the lens. Reducing the diameter of the aperture by a factor of $1.4=\sqrt{2}$, reduces the area of it by a factor of 2. Such a reduction may be compensated by doubling the exposure time, or by doubling the luminous intensity of the lighting. Dividing the focal length of the lens by the effective diameter of the aperture yields the f-number. For example, a 110 mm lens and an aperture diameter of 10 mm would equal f/11.

Specular reflections may give problems in automatic adjustment of exposure time of the camera. In a digital camera, exposure time may be controlled by software. In CCD cameras, exposure time basically corresponds to the reading time of the CCD. Based on the brightness of the specular reflections, the exposure time may be chosen too short, which results in an obvious under-exposure of the useful image area. Moreover, if the exposure time is too short, then a low signal to noise ratio may arise and blur the digital image. By increasing the exposure time or charge integration time, conventional CCD sensors may give blooming problems. Setting the exposure time correctly to cope with specular reflections, will avoid blooming of CCDs but will render the main scene too dark. Setting the exposure time correctly for the "main scene" causes the main scene to appear good, but may cause blooming effects in CCD arrays. As a consequence, highlights are "burnt out", i.e. no detail is visible in the highlight regions.

Dynamic range is a measure of how wide a range of subject luminance (e.g. brightness) a sensor can accurately reproduce. Just about any digital camera can capture a wider range of brightness values than the printed page can reproduce. Therefore, the software or hardware must compress the full range of scene brightness into a range that printing devices can reproduce. This capability is called tone compression. Different devices may use different input-to-output curves to accomplish it. As a general purpose, tone compression avoids losing either the highlights or the shadows, yet still maintaining reasonable contrast in the midtones. The resulting tone curve may be S-shaped, flattening at the extremes, with a steeper slope in the midtone area.

The photographer may make several exposures, varying the lens aperture, the integration time or for linear CCD arrays the line time, brightness of the lighting conditions and so on.

In the past, several attempts have been made to adjust tone curves, merely by avoiding the influence of possibly present specular reflections. MegaVision, Inc., located in Santa Barbara, Calif., introduced ToneBall, a tool for adjusting a camera's tone curve. It comprises three wooden balls—one white, one black and one grey—glued together. Unlike flat grey-scale control strips, which can catch specular glare from the lights, ToneBall is round; thus the photographer can always find a glare-free portion of the sphere on which to measure the reference colours. According to the ToneBall method, specular reflections are merely avoided rather than spotted and corrected for, as proposed in the description of the invention herein below.

EP-A-0 335 419 describes a method and apparatus for establishing highlight and shadow densities on the basis of a cumulative histogram of densities in an original. A reference density $X_{HR}$—associated with a prescribed reference statistic value $Y_{HR}$—is compared with a prescribed threshold density $X_{HS}$, to select one out of two possible methods for establishing a gradation correction curve. The method described in this prior art document merely finds out whether the distribution of highlight densities is "normal" or "abnormal". A high occurrence or frequency of highlight densities would classify the image as normal and select a usual gradation correction curve. A low occurrence of highlight densities would initiate exceptional processing for an abnormal original by shifting the gradation curve so that the gradation correction curve does not include useless part at its highlight end. Specular reflections however give a remarkable occurrence of highlight densities and though require exceptional processing according to the method described herein below.

In Photoshop (a trademark of Adobe, Inc.) an "auto-level function" is available. Application of this function considers "specular reflections" as "highlights in the main scene" and therefore may compress the dynamic range of the "main scene" such that too much density variations—though originally present in the raw image—are lost by the gradation correction. The "main scene" is that portion of the image that contains the most relevant information for the photographer. This may include text or logos on partly specular objects, etc. Moreover, tone correction may be different for different colour channels and may therefore degrade the colour balance of the digital image. If the brightest spot has no true neutral white colour, then colour casting may occur.

OBJECTS OF THE INVENTION

It is therefore a first object of the invention to provide a method for detecting whether or not specular reflections are present in the scene, the image of which must be digitized.

It is a further object of the invention to use the information about specular reflections in a method to set the aperture width and the exposure time or integration time.

It is even a further object of the invention to provide a method for computing a gradation curve, suitable for correction of a digital image, in which specular reflections occurred.

Further objects and advantages of the invention will become apparent from the description hereinafter.

SUMMARY OF THE INVENTION

The above mentioned objects are realised by the specific features according to claim 1. Preferred embodiments of the invention are disclosed in the dependent claims.

According to the method of the current invention, an image level is searched, which is specific for specular reflections. An image level may be a density level or an intensity level. Usually for a density level, the level 0 represents white. Positive levels represent grey levels up to black. For an intensity level the level 0 represents black, whereas positive levels represent grey up to white. For colour images, black corresponds solid colour, whereas white corresponds to faint colour.

A highlight image level, is that image level which represents the intensity of the lightest spots in the image, where abstraction is made from specular reflections, i;e. the pixels corresponding to specular reflections are "removed" from the image.

A photo-sensitive means is a system that converts the energy of incident light, or electromagnetic waves in the neighbourhood of visible light, to electronic signals.

A luminous image is usually the image which is formed by a lens or lens system. That image is usually projected in a plane.

The intensity of a luminous image may be expressed in lux. Together with the exposure time, that intensity gives the exposure, which is the energy that is converted to the electronic signal.

Since abstraction may be made from density level or intensity level, it is useful to take the absolute value $\|z-t\|$ of a difference z-t (z and t representing predetermined density or intensity levels), in order to be sure that the result is always positive. $X_{MAX}$ may be a level that corresponds to the lowest intensity highest intensity within the image. If the lowest intensity is not explicitly established, $X_{MAX}$ may also be equated to an extreme value of all possible image levels, corresponding to a low intensity or high density.

DETAILED DESCRIPTION OF THE INVENTION

The invention is described hereinafter by way of examples with reference to the accompanying figures wherein.

While the present invention will hereinafter be described in connection with preferred embodiments thereof, it will be understood that it is not intended to limit the invention to those embodiments. On the contrary, it is intended to cover all alternatives, modifications, and equivalents as may be included within the spirit and scope of the invention as defined by the appending claims.

Figure 1:
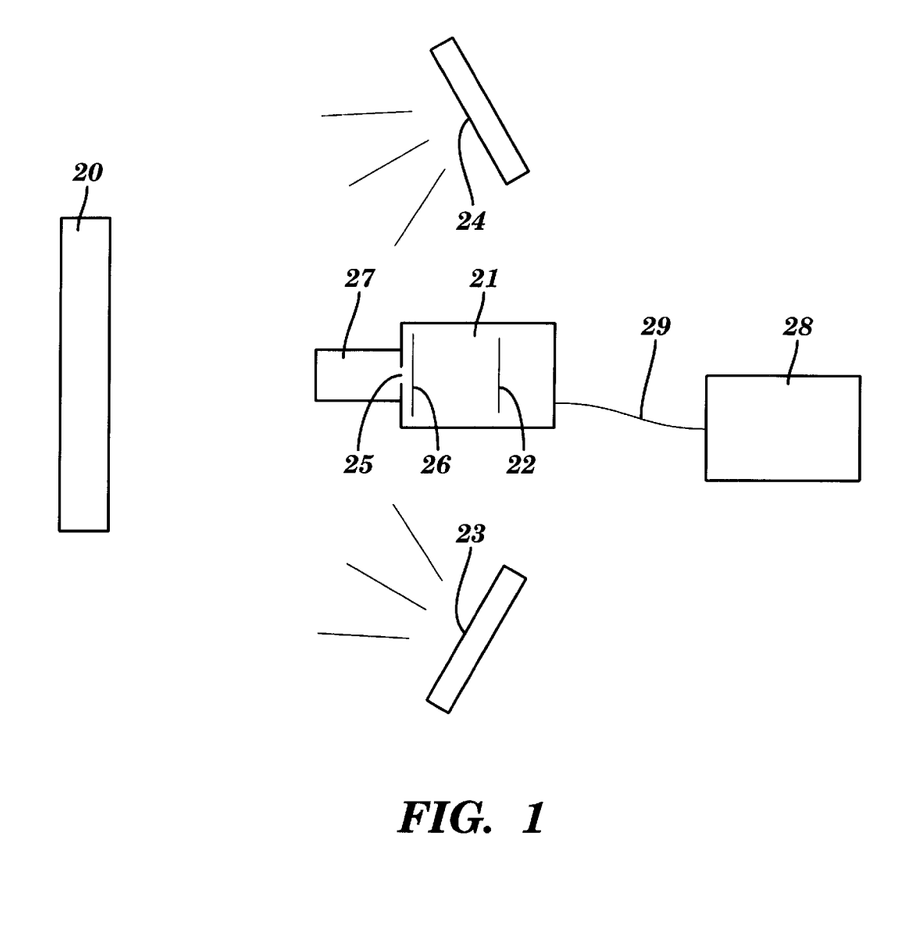
FIG. 1 shows a specific embodiment for carrying out the method according to the current invention.

The current invention may be carried out on a StudioCam digital camera. StudioCam is a trademark of Agfa-Gevaert N.V., based in Mortsel, Belgium. Referring to FIG. 1, a digital camera 21 is a sampled imaging system, i.e. a device that generates digital image signals by sampling an array of discrete points, or along a set of discrete lines, rather than a continuum of points. The sampling at each point is done using a finite size sampling aperture or area. The digital camera comprises a kind of light-sensing device 22, whose output can be measured electronically.

In the digital camera, suitable for the current invention, light passing through the lens 27 falls on a grid of light-sensitive cells making up the surface of a CCD. Depending on the intensity or illuminance and the exposure time of the light striking each cell, the CCD transmits an electrical signal of varying strength.

A CCD or charged-coupled device forms an array of light-sensitive metal oxide semiconductor (MOS) transistors that react electronically to exposure of light and can store electrical charges in a sequential fashion. After a reset pulse, which removes superfluous electrical charges from previous acquisitions, in a Studiocam, light is captured by an array of 3648 photodiodes as image sensing elements, in each of which an electrical charge is built up, during an integration which $t_{INT}$. The electrical charge of the photodiodes is transferred by a clock pulse to a CCD analog shift register. The charges in this shift register are transmitted serially to a signal output buffer.

The light sensed by the device 22 is coming from a scene 20, which is reflecting the illumination light from a light source 23, 24. Alternatively, illumination light, e.g. a halogen lamp, traverses a transparent original and the light attenuated by the image on the transparent original, reaches the light-sensing device 22.

For practical digital photography, charge-coupled devices (CCDs), having a light receiving surface and mounted in an integrated CCD unit, are preferred.

The photosensitive element used in the image sensor 22 of the camera 21, suitable for the current invention, photoelectrically converts exposure by light E—E expressed in Lux.sec—to electrical charge Q—expressed in Coulomb—in CCD cells or image sensing elements. Exposure E is the amount of light energy offered to the photosensitive element by an illuminance I (I expressed in lux or lumen per square meter) during a short period of time. This short period of time is called the integration time or exposure time. The exposure is thus related to the integration time, exposure time or shutter speed for one-shot camera's. Since the exposure E is related to the illuminance I too, E is also related to the brightness B of the light source 23, 24 or the scene 20 and the aperture 25 of the camera. The shutter 26 of a traditional camera is the device that controls the moment of exposure and the length of time light is allowed to expose the film to produce a latent image. In a CCD-based camera, the exposure time is controlled by timing signals applied to the sensors. The electrical charge $Q_i$ is also a linear function of the exposure time. Since the electrical charge $Q_i$ is stored by a capacitor, the electrical charge $Q_i$ corresponds to a voltage $V_i$.

For still-life product photography, a scanning trilinear colour CCD array, having 3 times 3648 elements, is used, allowing for one-pass scanning of colour and monochrome digital images. A trilinear array comprises three linear CCD arrays glued side by side. Each CCD line image sensor comprises a plurality of CCD elements one-dimensionally arrayed in a direction perpendicular to a main scanning direction. Each array is covered by its own colour filter, typically in the form of dye that is painted over the photosensitive cells. In order to acquire a complete digital image from a scene 20, the array makes a single pass across the image plane, and each linear CCD scans a line at a time, taking red, green and blue exposures sequentially for each sensor to align the images atop each other.

The trilinear array may be moved in a one-pass scanning fashion by a precision stepper motor. As a result, the colour planes, also referred to as separations, of the digital image are interleaved and the computer must rearrange the lines. The whole process turns the image from the scene 20 into a colour-separated computer file. As such, the output of the digital camera digitised and colour-separated. The number of steps of scan lines is equal to the number of separate exposure steps, i.e. 4500.

The lens 27 has the function to project light from the scene 20 on the image plane 22.

The image plane in a conventional camera is the plane on which usually the film lies in the camera. The plane is commonly at right angles to the optical axis at which a sharp image of the subject in the scene 20 is formed. The camera lens 27 is designed to bring images into focus precisely at the image plane or film plane to ensure correctly exposed pictures. In StudioCam a Nikon zoom lens 35–80 mm/F:4–5.6 is preferably used.

The incident light focused on the light receiving surface of the CCD line image sensor is photoelectrically converted into an image signal $V_{CCD}$ for each pixel by the CCD line image sensor. The analog voltages of the image signal $V_{CCD}$ are serially transmitted to one analog register. The analog voltage in that register is digitised by a 12-bit A/D-convertor (Analog to Digital Convertor or ADC). The bit depth of the image sensor is thus 12 bit. For colour images this results in 36 bits per pixel. If the 12 bits are reduced to 8 bits in a later stage, 24-bit colour images are generated. The analog voltage applied at the input of the ADC is minimal if the intensity or illuminance I (for a fixed exposure time) of the corresponding photo-sensitive element was below a certain lower limit. In such case, it is usual to deliver a digital value of 0 at the output of the ADC. If the intensity I reaches a specific upper limit (again for a fixed exposure time), then the analog voltage applied to the input of the ADC reaches a maximal value, for which the ADC is said to go in saturation. In such case, the ADC traditionally outputs its maximum digital value $I_{MAX}$. For a 12-bit ADC, this maximum digital value $I_{MAX}$ may be 4095. Since the digital values output by the ADC correspond to the intensity I of the light incident in the photo-sensitive element, these digital values are often referred to as "intensity values". Traditionally, digital values from the 12-bit ADC are in the interval [0,4095]. A higher digital value or "intensity value" corresponds with a higher intensity I of the light hitting the corresponding photo-sensitive element. Since the exposure E is the product of exposure time $t_{INT}$ and illuminance I or intensity, whereas the electrical charge Q built up in the photo-sensitive element is a linear function of the exposure E; and the voltage V applied to the input of the ADC is a linear function of the electrical charge Q, the digital output value generated by the linear ADC is also a linear function of the input analog voltage V. As such, the digital output value or "intensity value" is a linear function of the illuminance or intensity for a fixed exposure time and within the dynamic range of CCDs and the ADC. The intensity values are thus also a linear function of the brightness or luminance of the corresponding portion of the scene.

Since specular reflections result in high illuminance I of the affected photo-sensitive elements, high "intensity values" are generated. The discussion below will concentrate thus on "high intensity values". In order to alleviate that discussion, these "high intensity values" are moved to the origin of the graphs for a histogram (FIG. 2) and a cumulative histogram (FIG. 3). As such, the highest "intensity value $I_{MAX}$" gets a value 0, and is therefore referred to as a "(optical) density value". The "highest intensity value" thus corresponds to the "lowest density value $D_{MIN}$". In a 12-bit system as defined before, the relation between "density value X" and "intensity value I" may be defined by the simple relation:

$$X = 4095 - I$$

Since optical density D is a logarithmic function of the ratio of incident light and reflected light, there is no real linear correspondence between the "optical density D" of the scene and the "(optical) density value X" as defined herein before. Such a "density value X" is often referred to as "opacity" to avoid confusion with a (logarithmic) density.

Digital data, generated by the A/D-convertor, are temporarily stored in a local data buffer within the camera.

The raw data coming from the camera have 12 bits per colour per pixel, i.e. 36 bits per pixel are captured. Since 8 bits per colour and per pixel are sufficient to represent a digital image, each 12 bits are converted to 8 bit data based on tone curves set by the host computer 28. Tone curve adjustments govern the way that 12-bit data coming out of the camera's A/D-convertor will be mapped to 8-bit data. Care must be taken to avoid posterizing. Posterizing is also referred to as "tonal breaks" or "quantization".

A SCSI-II link 29 (Small Computer Systems Interface, version 2) is used for moving the 12-bit digital image data from the digital data buffer in the camera 21 to the host computer 28. The transfer rate is typically 1 megabyte per second (1 MB/s). Preferentially the Agfa FotoLook scanning interface is used for acquisition of the digital image in the host computer. FotoLook is a trademark of Agfa-Gevaert N.V. The intelligent Agfa FotoLook interface can handle automatically exposure levels, contrast, colour balance and computer-enhanced sharpness, if necessary, In an alternative embodiment, the camera comprises an area CCD with coloured cells. The CCDs are arranged in a rectangular CCD array and can capture the entire image in a very short time. Tiny colour filters are placed directly over the individual cells of the CCD array. The filters may be made from droplets of dye. ActionCam (trademark of Agfa-Gevaert N.V.) is a digital camera comprising an area CCD, suitable for carrying out the method according to the current invention.

According to the current invention, the illumination of the scene may be varied, the size of the aperture changed or the integration time may be optimized. As said above, increasing the aperture may compromise the depth of the scene. Another drawback of a larger apertures—corresponding to a lower integration time or line time—is the limitation of CCD sensors with respect to their reaction to severe illumination overloads. In the face of extremely high light overloads, some CCDs will "leak" charge from the overexposed elements into adjacent cells. This phenomenon is called blooming, and various methods are employed to prevent it. It most frequently shows itself as a coloured fringe around specular reflections. Usually, the sensor will bloom differently in each of the red, green or blue channels, producing the coloured fringes where one channel has bloomed more than the others.

Instead of acting on the "shutter speed", a digital camera of the CCD type may operate an integration time $t_{INT}$. In a digital camera having one or more linear CCD arrays, the integration time $t_{INT}$ considerably determines the line time. A typical speed setting or line time for the StudioCam digital camera is between 20 and 50 millisecond [20–50 ms] per scan line, to compensate for lighting conditions and lens aperture. The line time is set according to the amount of light in the scene. The camera allows exposure settings ranging from 9 ms to 100 ms. A suitable setting for a minimal line time with acceptable noise levels is 15 ms. Once the aperture has been properly selected, a line time between 30 and 50 ms is more appropriate.

In a preferred embodiment, a preliminary exposure or "pre-scan" is made. The purpose of the pre-scan is to select an appropriate aperture setting and to select a suitable exposure time. Preferably, the aperture and exposure time are selected such that no over-exposure of the photosensitive elements occurs throughout the image, even not in regions of specular reflections. As such, also blooming is completely avoided. In selecting the aperture, a trade-off is made between depth of the field and luminous flux. By closing the aperture, depth of the field may be larger for a good sharpness. By opening the aperture, the luminous flux entering the camera increases, allowing a smaller exposure time and consequently a shorter image acquisition time. If the photographer has no experience with the aperture or exposure setting, he may manually select an intermediate aperture and install a relatively short exposure time, i.e. 15 millisecond (15 ms). In another embodiment, the aperture may be set by a motor, which may be controlled by software running on the host computer and/or on the digital camera.

A first preliminary digital image is shot and the digital data are acquired by the host computer. As set out below, a density histogram (FIG. 2) for the preliminary digital image is made. A first analysis of the density histogram reveals whether the image was largely over-exposed or under-exposed. In the case of over-exposure, the photographer is asked to narrow the aperture. In the case of under-exposure, the photographer is asked to widen the aperture. Under-exposure is obvious for example if on a full scale of 4096 digital levels, only levels 0 to 100 are occupied. If changing the aperture is not appropriate, the photographer may opt for decreasing the exposure time in case of over-exposure or increasing the exposure time in case of under-exposure. Alternatively, the luminous intensity of the lighting may be decreased or increased respectively. Under-exposure may be detected by the fact that a large range of low density levels is completely absent in the digital image, which may be derived from the density histogram by observing a frequency count of zero from the lowest density levels up to a medium or higher density level. Over-exposure may be detected by a serious concentration of digital image pixels having the lowest density level or highest intensity level. If more than 25% of the pixels have the lowest density level, then the image is clearly over-exposed. Even if at least one pixel has the highest intensity value $I_{MAX}$ (=4095 in 12-bit system), the photographer may be informed that the photosensitive means is over-exposed. In such a case, the ADC will map all intensity levels corresponding to a digital value higher than the highest possible value $I_{MAX}$ to that maximum value $I_{MAX}$. If all pixels have an intensity value lower than the highest value $I_{MAX}$, over-exposure is absent. If a change of aperture or exposure time was necessary, due to over-exposure or under-exposure, a new pre-scan of the scene may be necessary. Otherwise, the first acquired image may be used in the procedure as set out below.

Figure 2:
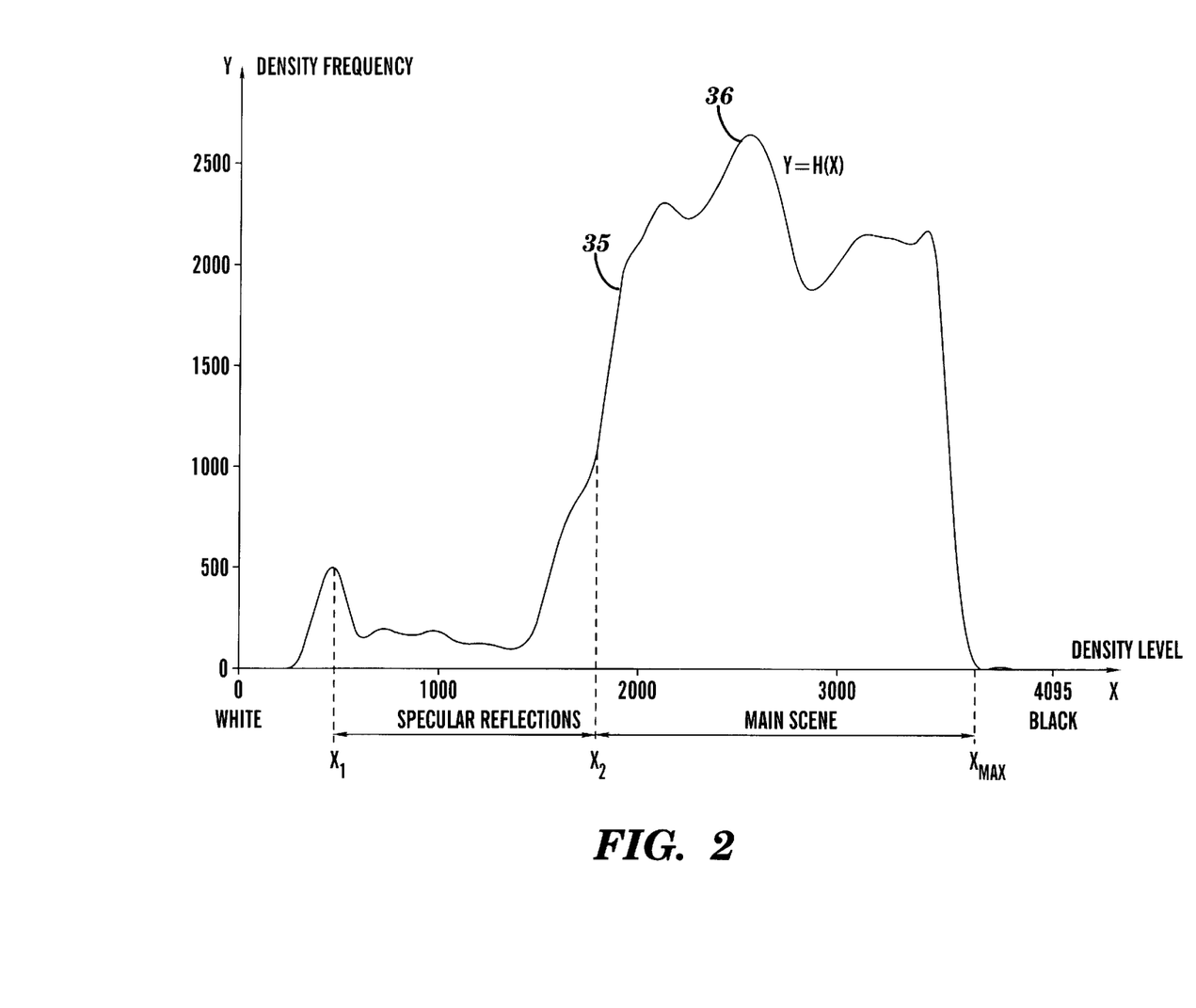
FIG. 2 shows a typical density histogram for an image comprising specular reflections.
Figure 3:
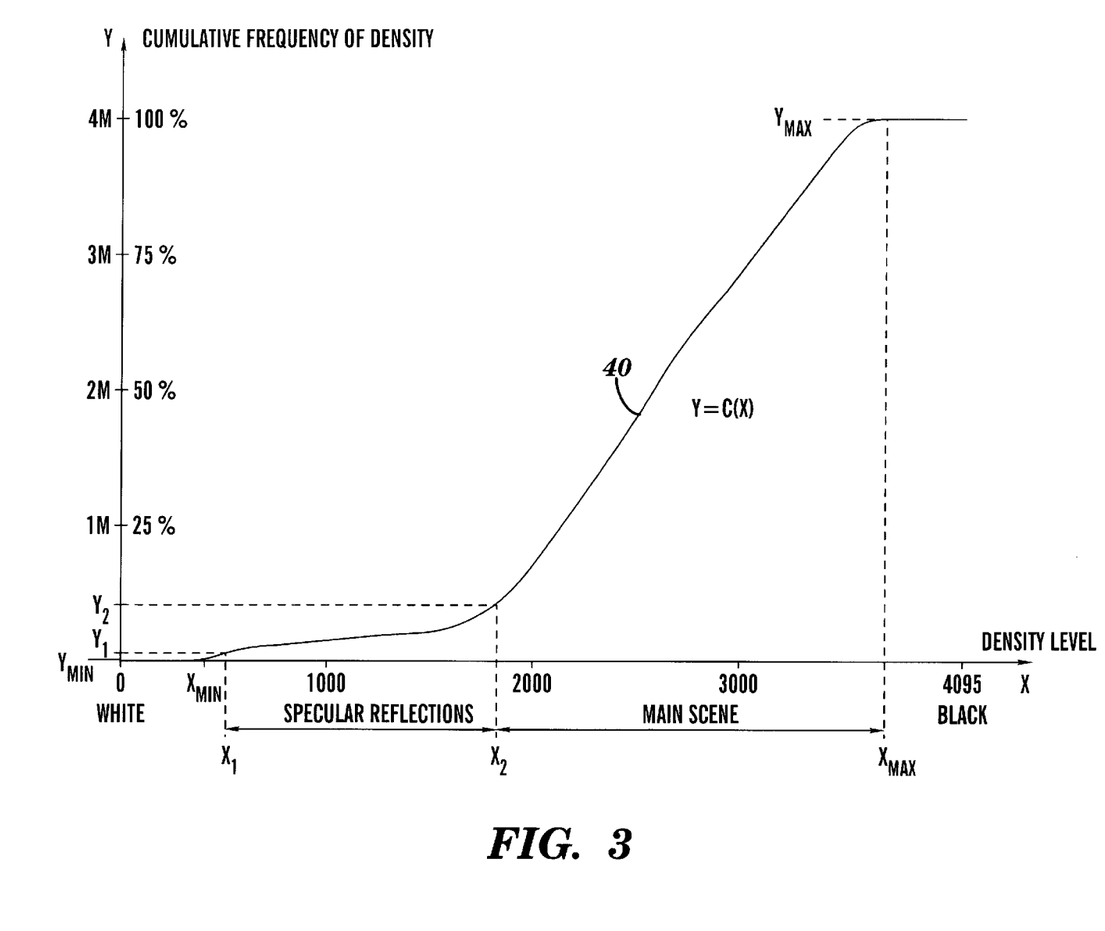
FIG. 3 shows a typical cumulative density histogram for an image comprising specular reflections.

In a preferred embodiment, on the basis of image data obtained by a pre-scanning operation with suitable aperture and exposure time setting, a statistical curve or density histogram Y=H(X) 35 as in FIG. 2 is generated by a histogram counter circuit, counting the frequency of occurrence Y of the 12-bit digital image signals X. A density histogram may be generated by the following piece of C-language code:

define MaxDens 4096

```
int i, X, H[MaxDens] ;
/* MaxDens=2 exp bit-depth ; MaxDens=4096 if bit depth=12 */
/* function get_pix_val() returns 0 if end of image reached   */
/*                        returns 1 otherwise                  */
/*                        returns pixel value in first argument */
for ( i=0 ; i < MaxDens ; i++) H[i] = 0 ;
while ( get_pix_val (&X) ) H[X] = H[X] + 1 ;
```

Preferentially, the values X returned by the function get_pix_val( ) come directly from the A/D-convertor. A density histogram H(X) depicts the distribution of grey values X of image data in a digital image. A histogram graph is a plot of the number of pixels Y having each given density value X, drawn across the range of all possible density values. The abscissa axis of the graph is density X. The ordinate axis of the graph is frequency of occurrence Y of pixels having the density X. A density interval AX of the graph is a unit of density width used for constructing the density histogram. In a preferred embodiment the width of the density interval is one density level, such that a device capable of giving 4096 density levels would give a density histogram with 4096 frequency counts, each count corresponding with one density level. It is however also possible to arrange pluralities of individual density levels in—preferentially mutually disjunctive—density classes, and computing a frequency count for each class. For example, density values 0 and 1 may be arranged in a first class, density values 2 and 3 in a second class, density values 2*N and 2*N+1 in an (N+1)th class etc. For each class the histogram reflects the occurrence in the image of density values belonging to that class. Classes do not necessarily need to have the same number of density values.

For histogram computation, it is also not necessary that the density values of all pixels of the digital image are used. The digital image may be sub-sampled with a factor of two, three, four or more in one or two dimensions, in order to substantially reduce the pixel count. In one embodiment, every other pixel may be skipped and each even line may be deleted or omitted for histogram calculation. Since in a preferred embodiment, the final cumulative histogram is normalised to 100%, other computations are barely influenced by this type of computation reduction.

According to FIG. 2 the range of possible pixel values X extends horizontally, with the extreme right-hand edge corresponding to black, and the extreme lefthand edge corresponding to white. A higher peak at a given point means that more pixels in the image have that value than have other values. FIG. 2 shows a simulation of a histogram for a 12-bit image having 4 mega (4M) pixels, i.e. $4*2^{20}$ pixels.

Note in FIG. 2 that the density histogram shows a substantial number of pixels within the density region from 1400 to 3600, with relatively few in the highlight zone 0 to 1400. There are no pixels having a density level of 0. If this were the case, then photo-sensitive elements would have been over-exposed. According to the method of the current invention, this is preferably avoided by decreasing the exposure time and acquiring a new digital image such that no pixels have density level 0.

A cumulative density distribution $Y=C(X)$ as 40 in FIG. 3 may be derived from the density histogram $Y=H(X)$. A cumulative density histogram expresses a cumulative frequency of occurrence Y of densities X or density distribution on an image. Generation of a cumulative histogram $C(X)$ from a density histogram $H(X)$ may be done by the following piece of C-programming language code:

C[0]=H[0];

for (i=1; i<MaxDens; ++i) C[i]=C[i−1]+H[i]

As shown in FIG. 3, which is the cumulative histogram according to FIG. 2 $Y=C(X)$ is preferentially defined on an X-Y coordinate plane having an X-axis representing optical density levels and a Y-axis representing a cumulative number of pixels or the cumulative frequency of occurrence Y concerning the density X. The scale of the Y-axis is preferably normalised to range from 0% to 100%. This may be accomplished by dividing each individual cumulative pixel count by the maximum pixel count or terminal value $Y_{MAX}$ on the Y-axis at which the cumulative histogram $Y=C(X)$ is terminated, which is located at the right hand side of the cumulative histogram, which is equal to the total pixel count of the complete image, 4M in this example. As such cumulative frequency values between 0.0 and 1.0 are obtained, which may be multiplied by a factor 100 to give percentages [%].

According to the current invention, and as shown in FIG. 3 a first prescribed value of reference specular cumulative frequency $Y_1$; and, a second prescribed value of reference highlight cumulative frequency $Y_2$, both on the Y-axis are converted by the cumulative histogram $Y=C(X)$ to thereby obtain a first reference specular density $X_1$; and, a second reference highlight density $X_2$ respectively, both on the density axis or X-axis.

Optionally, the terminal value $Y_{MAX}$ on the Y-axis at which the cumulative histogram $Y=C(X)$ is terminated is converted to the terminal density $X_{MAX}$ on the X-axis, at which the cumulative density histogram $Y=C(X)$ reaches a hundred percent terminal value $Y_{MAX}=100\%$. If $X_{MAX}$ is not determined by the above conversion, it is predetermined at the maximum value that can be achieved by apparatus generating the density values. $X_{MAX}$ is hereinafter referred to as "maximum density".

Practical experience has pointed out that the value of reference specular cumulative frequency $Y_1$ may be selected at $Y_1=0.1\%$, whereas the value of reference highlight cumulative frequency $Y_2$ may be selected at $Y_2=0.5\%$. As may be noticed on FIG. 3, the simulation is not at scale with respect to this point. The corresponding first reference specular density $X_1$ then corresponds to the density value of points in the specular portion of the scene as shown in FIG. 2 and FIG. 3. The second reference highlight density $X_2$ corresponds to the density value of the brightest points of the "main" scene, also referred to as "highlight points". The main scene is that portion of the scene that does not comprise specular reflections. Other values for $Y_1$ and $Y_2$ are also suitable, though it may be stated that the values for $Y_1$ and $Y_2$ must be predetermined, obeying the following inequalities:

$10^{-5} \leq D_1$ $D_1 \leq (D_2/2)$ and $D_2 \leq 0.1$ where $D_1=\|Y_1-Y_{MIN}\|$ and $D_2=\|Y_2-Y_{MIN}\|$. Typically, $D_1 \leq 0.2\%$ and $D_2 \leq 1.0\%$.

The above constants $10^{-5}$ and 0.1 correspond to 0.001% and 10% respectively.

For a scene, in which specular reflections are rather occasional than specifically aimed for, the first prescribed value of reference cumulative frequency $Y_1$ may be preferably set at 0.0% to 1.0%. The second prescribed value of reference cumulative frequency $Y_2$ must be larger than the first one, i.e. $Y_2>Y_1$. The values of $Y_1$ and $Y_2$ are empirically determined as cumulative frequencies close to a minimum value which can invariably specify one typical density of an original according to density character of the original without influence of dust, defects and the like on the original, the scene or in the optical path. It has been observed that specular reflections typically occur in very small portions of the scene. As such a very small percentage of the total area of the digital image is affected by the specular reflections. Consequently, the values of $Y_1$ and $Y_2$ are not limited to the above stated ranges.

It has been observed that due to the small number of pixels (small area) having a significant low density compared to the main image density, the cumulative density histogram has a clear platform between the densities representing the specular reflection points $X_1$ and the highlight points $X_2$ from the main scene. The first portion of the histogram between $X_2$ and $X_{MAX}$ corresponds to the "main range", whereas the portion between $X_1$ and $X_2$ corresponds to the "specular reflections range" Therefore, it may be stated that if $X_2-X_1$ is small, i.e. no platform exists, it may be assumed that no specular reflections are present in the image. If the reference specular density $X_1$ has a value much smaller than the reference highlight density $X_2$, i.e. $X_2-X_1$ is large, then it is assumed that the scene comprises specular reflections from the lighting. This may be expressed by the following equation:

$$\alpha = \frac{X_{\text{MAX}} - X_2}{X_{\text{MAX}} - X_1}$$

If in the above equation $\alpha > 0.875$, then it is assumed that no specular reflections are present. If however $\alpha \leq 0.875$, it may be assumed that specular reflections are present.

The above value 0.875 has been found empirically and may vary also between 0.95 and 0.70 for practical situations. As stated above, the value $X_{MAX}$ may be derived from the point $Y_{MAX}$ where the cumulative density histogram reaches its maximum. It is however also possible to fix the value $X_{MAX}$ to the maximum density value that may be reached by the system, e.g. in a 12-bit system, $X_{MAX}$ may be selected to have the value 4095, or a value within 10% above or below that value.

If the software on the host computer detects by application of the above method that specular reflections are present in the image, the photographer or operator at the host computer may be informed about this fact, e.g. by an audible bell signal and/or a warning message on the display monitor. The choice may then be left to the photographer to optimize the exposure time of the camera, based on the position of $X_1$ and $X_2$ on the cumulative density histogram. The final exposure may then be done using an optimal exposure time.

Since the CCD's give a linear response on exposure, "intensity values" I, as defined above, will double if the exposure time or integration time is doubled. Suppose that the pre-scan has been taken with an exposure time T, and that the specular reflections have an intensity $I_1 = 4095 - X_1$. If the photographer selects that the specular reflections should get an intensity $I'_1$, then the required exposure time for the final shot is given by the equation: $T' = T*I'_1/I_1$. Thus exposure time is adjusted such that the intensity of the specular reflections is mapped to the maximum digital intensity level, thus avoiding blooming but maintaining maximum dynamic range.

By choosing $I'_1 = 4095$, the photographer may stretch the complete histogram, including specular reflections, to cover all possible intensity or density values.

Alternatively, the exposure time may be given by the equation: $T'' = T*I'_2/I_2$.

In the above equation, $I_2 = 4095 - X_2$ is the intensity value of the highlights in the main scene, and $I'_2$ is the required intensity value for these highlights. If the photographer wants to get the maximum out of the "main scene", i.e. the portions of the scene, not including the specular reflections, then he may select to set $I'_2 = 4095$, and set the new exposure time T" accordingly. This way, the full dynamic range of the CCDs is used to digitize the useful image area and main scene, and the dynamic range is even more stretched than in the case of T'. A drawback of this large stretching is the possible risk of introducing blooming by over-exposing photo-sensitive elements with the specular reflections. Large white spots without any internal information may appear. An important advantage however is noise reduction.

In another embodiment, the photographer may wish to set the new exposure time to a value within the range [T',T"]. This way he is sure to get full detail up to and including the highlights in the scene, and even some detail close to the specular reflections, and thereby diminishing the risk of blooming.

Once the final digital image is captured, by suitable or optimal settings for lighting conditions, the aperture and exposure time, the final digital density values X may be transformed to corrected density values X' by a suitable gradation correction curve. A traditional linear gradation curve would result in a restricted density range for the main scene and a large density range for the specular reflections.

Figure 4:
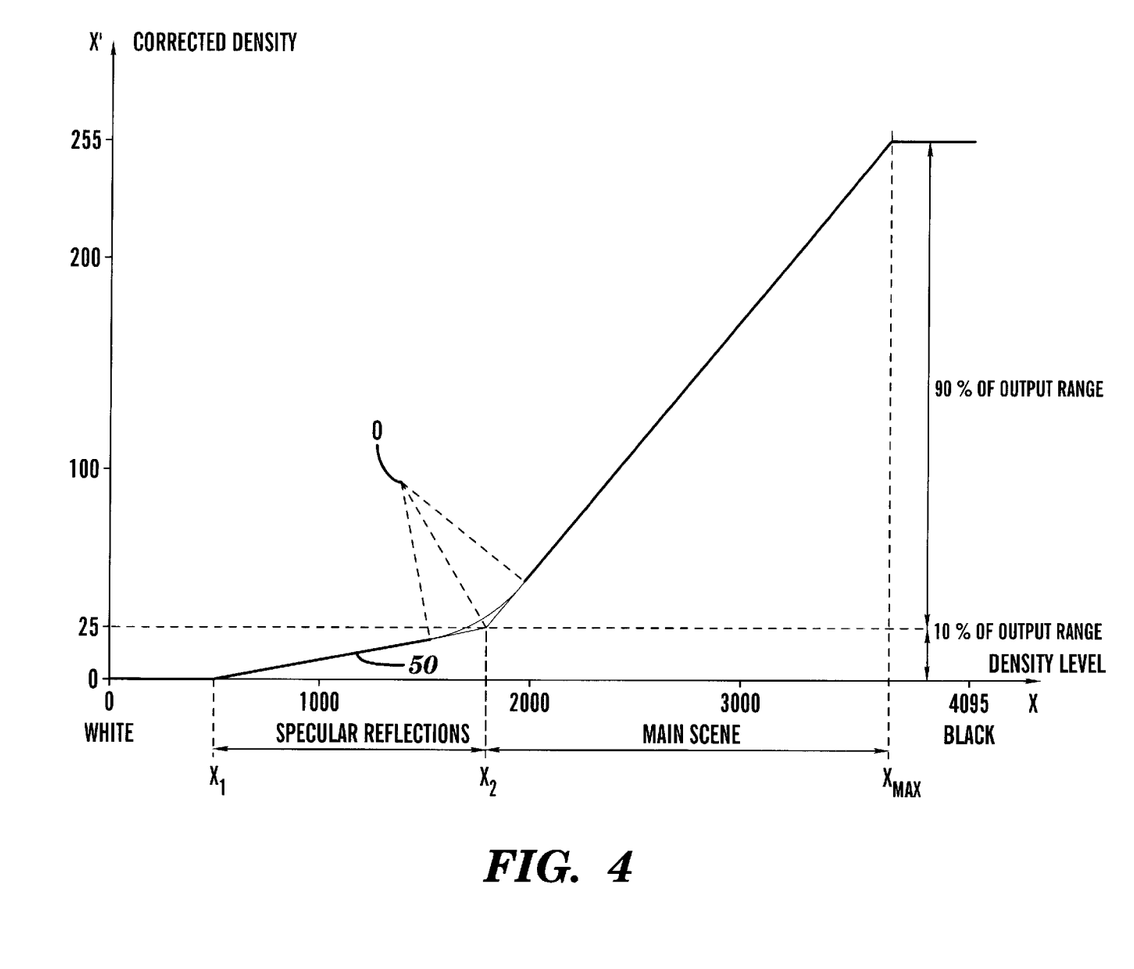
FIG. 4 shows a suitable gradation correction curve for coping with specular reflections.

To optimise intensity or density values, making use of the knowledge gathered in the cumulative histogram, a method as described herein below is preferred. A specific gradation correction curve is established for gradation control and is applied to image data obtained by digitizing an image from a scene or an original. A suitable gradation correction curve is set out in a graph, as shown in FIG. 4. The abscissa axis of the graph is density X, the ordinate axis is "corrected density" X'. The gradation correction curve 50 X'=G(X) is determined as a curve drawn trough coordinate points (X,X')=(0,0) and (MaxDens,MaxDens'), which are specified by the values of the minimum density X=0, X'=0 and the maximum density X=MaxDens, X'=MaxDens'.

In a preferred embodiment a piecewise linear gradation correction function X'=G(X) is applied to the digital image comprising specular reflections. The purpose of the gradation correction is to compress the dynamic range between the highlights of the main scene and the specular reflections, while keeping more detail in the main scene by expanding there the dynamic range. A piecewise linear function requires for each straight line segment a start point and an end point. The end point of a straight line segment—except for the last straight line segment—coincides with the start point of the next straight line segment, thus imposing continuity for the piecewise linear function. Such an end point/start point is called an internal break point or shortly a break point. In a preferred embodiment, the piecewise linear function consists of two straight line segments, thus having one break point $(X_B, X'_B)$. Calculation of the X-position $X_B$ of the break point, the first start point $X_S$ and the last end point $X_E$ is preferably based on data from the cumulative histogram. In a preferred embodiment, as shown in FIG. 4:

$X_S = X_1$  $X_B = X_2$  $X_E = X_{MAX}$

In a preferred embodiment the density range corresponding to the main scene is mapped to a range occupying 3/4 of the total output range, whereas the range between the highlights of the main scene and the lightest specular reflections is mapped to a range occupying 1/4 of the total output range. In an embodiment where 12-bit digital values are transformed to 8-bit image values, the values corresponding to the main scene may be converted, according to the gradation correction curve, to output density values within the range of 0 to 63, whereas specular reflections may be transformed to density values within the range 64 to 255.

In another embodiment, the range of the main scene may be mapped to a 90% or even 95% sub-range of the total output range. The remaining 10% or 5% sub-range receives by mapping the range from the highlights to the specular reflections. The above mentioned abscissa values $X_S$, $X_B$, $X_E$ are thus preferentially mapped to:

$X'_S = 0$  $X'_B = \alpha X'_E = X_{MAX}$ wherein $\alpha$ is in the range of [60%, 95%].

A gradation correction table may thus be generated on the basis of break points obtained according to the above procedure. Data expressing the relation between density X and corrected density X' may be stored in the RAM of the gradation correction circuit to form a look-up table.

After a gradation correction table, expressing the gradation correction curve G(X), is stored in RAM, digital image data may be acquired a second time, whereby the image data thus obtained is given to the gradation correction circuit. The image data is corrected in the circuit according to the gradation correction curve G(X), to thereby be changed into corrected image data X'. The recorded corrected image may then be stored for later use, or reproduced on an image reproduction device, such as a typesetter, a printer or a digital press.

In a more preferred embodiment, the gradation correction curve is given by a modified piecewise linear function. It has been experienced that posterizing may occur in the corrected image at locations having density values close to the ordinate value $X'_B$ of the break point. The posterizing effect increases if the slope of the first straight line segment is significantly different from the slope of the second straight line segment. In order to make the slope a continuous function, even in the neighbourhood of the break point, a portion of both straight line segments is replaced by a non-linear curve. Such a curve may be a cubic spline function, i.e. a third degree polynomial having continuity of the 0th, 1st and 2nd derivative at each joint, where the straight line segment and the spline meet. Such a curve may also be described by a Bezier cubic curve. In a preferred embodiment the curve is formed by an arc of a circle. As shown in FIG. 4, the centre 0 of the arc is located on the bisecting line of the two straight line segments. The radius R of the arc increases if the slope difference increases. In a preferred embodiment, the distance between:

the original break point of the straight line segments; and, the joint of the straight line segment and the arc is not larger than one third of the length of the original straight line segment. In a more preferred embodiment, the radius R of the arc has also an upper limit.

By joining the two straight line segment by an arc, and as such smoothing the break point, posterizing or contouring caused by gradation correction may be seriously reduced or even completely avoided.

The description herein above has concentrated the discussion on one digital image or one image plane only. This may be suitable for a normal black and white scanner or digital camera, or for a colour scanner or camera for which only one colour channel is used. In the latter type the green colour channel is preferably used alone to acquire a black and white or grey-scale image, since this closely corresponds to the luminance L, as defined in the CIE-Luv colour space.

If however three colour channels give three different colour images, then for each colour a density value for $X_1$, $X_2$ and $X_{MAX}$ may be computed. If the colour channels are red, green and blue, then these values may be referred to as:

$X_{1R}$, $X_{2R}$ and $X_{MAXR}$ for the red channel;

$X_{1G}$, $X_{2G}$ and $X_{MAXG}$ for the green channel; and, $X_{1B}$, $X_{2B}$ and $X_{MAXB}$ for the blue channel.

In a preferred embodiment, from the above colour density values, the following uniform density values are computed:

$X_1$=minimum of ($X_{1R}$, $X_{1G}$, $X_{1B}$)

$X_2$=minimum of ($X_{2R}$, $X_{2G}$, $X_{2B}$)

$X_{MAX}$=maximum of ($X_{MAXR}$, $X_{MAXG}$, $X_{MAXB}$)

Such a selection makes sure that the break point of a gradation correction curve does not occur in within the density levels of any colour component of the main scene. The uniform values may then be used according to the method described above to compute one single optimal exposure time setting and to establish one single gradation correction curve. The gradation correction is equally applied to the digital image of each colour channel, such that colour shifts due to different gradation corrections are largely avoided. By the method as depicted here, not only specular reflection of white coloured light may be coped with, but also specular reflection from e.g. red coloured light.

In a preferred embodiment, the gradation correction reduces the bit depth of each colour channel to 8-bit. In a system including the StudioCam, which delivers 12-bit raw data per pixel and per colour, the gradation correction thus converts a 12-bit signal to an 8-bit signal. It is highly preferred that gradation correction is done on an image that has a bit depth of more than 8 bits. Otherwise posterizing may occur in density regions where the dynamic range must be increased, i.e. where the slope of the gradation curve is larger than 1.

Once each colour channel or colour plane is corrected by the suitable tone curve, further colour tuning and colour conversions—e.g. from RGB to CMYK printing colours—may be done by Agfa FotoTune (trademark of Agfa-Gevaert N.V.) colour management system or by Agfa FotoFlavor (trademark of Agfa-Gevaert N.V.) for selective colour corrections. Adobe Photoshop LE (trademark of Adobe, Inc.) may be used for image manipulation and data archiving.

In a preferred embodiment, two captures of the scene are sufficient. It is supposed that for the pre-scan operation the photographer installs a suitable aperture and selects an exposure time that avoids over-exposure completely, even if specular reflections are present. After a first pre-scan operation, giving for example a 12-bit digital image, a cumulative histogram is established, giving the values for $X_1$ and $X_2$. The photographer then decides whether he wants to increase the exposure time and to what extent. In the case where it is decided to increase the exposure time, a second capture operation is done and new values for $X_1$ and $X_2$ are established by making use of $Y_1$ and $Y_2$ values as described above. The values for $X_1$ and $X_2$ are used to construct a modified or smoothed piecewise linear gradation correction curve and the 12-bit digital image is converted to an 8-bit digital image. If three colour planes are captured for a colour image, then the same gradation correction is preferentially applied to all planes.

Alternatively, each 12-bit image may be transformed to a 16-bit image.

The apparatus used for the present invention is not restricted to the digital camera as set out in conjunction with the description of the StudioCam device, but the present invention may be applicable in other apparatuses such as electronic copiers, graphics arts scanners, drum type image scanners, facsimile terminal equipment, an image transmission apparatus and the like.

The image data processed by the present invention is not restricted to what is obtained through scanning and reading by a digital camera as described in the embodiments, but various types of image data, such as those obtained by so-called High Definition Television and other apparatuses referred to as New Media, can also be processed by the present invention.

Having described in detail preferred embodiments of the current invention, it will now be apparent to those skilled in the art that numerous modifications can be made therein without departing from the scope of the invention as defined in the following claims. For example, instead of making a complete cumulative density histogram, a number of low density ranges may be established. These ranges include presumable density values for specular reflections and highlight densities in the main scene. These ranges are preferably disjunctive and adjacent. For each density range or class only one count may be updated. This count reflects the number of pixels or digital image values that fall within that range. After all pixels of the digital image have been screened, or a selection of all pixels has been examined, these classes are scanned from lower to higher density ranges. The count of the first class is compared against a predetermined value for $Y_1$. If that count is lower than $Y_1$, the count is added to the count of the second class, giving a cumulative count for the second class. The cumulative count for the second class is compared against the predetermined value for $Y_1$. If that cumulative count is lower than $Y_1$, the cumulative count for the second class is added to the count of the third class, giving a cumulative count for the third class, etc. Once the cumulative count for a density class is not lower than $Y_1$, some density value within that class, e.g. the mean density value or a weighted density value may serve as $X_1$ value. The cumulative count is then further compared against a predetermined value for $Y_2$, just as in the case for $Y_1$, until the corresponding $X_2$ value is found.

Alternatively, each time when a new count for another class is accessed, that count is subtracted from both $Y_1$ and $Y_2$. As soon as $Y_1$ reaches a value below zero, then $X_1$ is found and the process goes on for $Y_2$. As soon as $Y_2$ reaches a value below zero, then $X_2$ is found and the process may stop.

The method is described based on density values, and numerical values for $Y_1$ and $Y_2$ on the cumulative histogram are given by reference to such values. It is however well within the scope of the invention to establish intensity values $Y''$ and to define:

$Y''_1 = 100\% - Y_1$ $Y''_2 = 100\% - Y_2$

Alternatively, intensity values are used and the cumulative histogram is built up starting from the highest intensity value. In that case, values for $Y_1$ and $Y_2$ may still be used.

We claim:

1. A method for detecting and processing a specular image density level $X_1$ and a highlight image density level $X_2$ in an illuminated scene comprising the following steps:

exposing a photo-sensitive means by a luminous image from said scene, thereby generating a plurality of digital image signals, each said digital image signal representing a density of a portion of said luminous image;

establishing a cumulative histogram for the image density levels of said digital image signals;

providing a reference specular cumulative frequency $Y_1$;

providing a reference highlight cumulative frequency $Y_2$;

converting said specular cumulative frequency $Y_1$ via said cumulative histogram, to obtain said specular image density level $X_1$;

converting said highlight cumulative frequency $Y_2$ via said cumulative histogram, to obtain said highlight image density level $X_2$; and indicating a presence of specular reflections when a ratio $\alpha = \|X_{MAX} - X_2\| / \|X_{MAX} - X_1\|$ is smaller than a predetermined value, wherein $X_{MAX}$ is an image density level greater than or equal to a highest density level within said luminous image.

2. The method according to claim 1, wherein said predetermined value is 0.875.

3. The method according to claim 1, wherein:

the specular cumulative frequency $Y_1$ and the highlight cumulative frequency $Y_2$ are selected such that:

the value $D_1 = \|Y_1 - Y_{MIN}\|$; and the value $D_2 = \|Y_2 - Y_{MIN}\|$;

wherein $Y_{MIN}$ is the cumulative frequency of the image level $X_{MIN}$ corresponding to the lowest density level in the luminous image, and wherein $10^{-5} \leq D_1$, $D_1 \leq (D_2/2)$, and $D_2 \leq 0.1$.

4. The method according to claim 4, wherein:

$D_1 \leq 0.2\%$; and, $D_2 \leq 1.0\%$.

5. The method according to claim 1, further comprising optimizing an exposure time for exposing said photo-sensitive means based on the image density level of $X_1$, $X_2$ or a combination thereof.

6. The method according to claim 6, wherein said exposure time is selected to move either $X_2$ or $X_1$ to an extreme image density level.

7. The method according to claim 1, wherein said image signals are further transformed by a gradation correction curve.

8. The method according to claim 7, wherein said gradation correction curve comprises linear segments, having a start point at $X_1$, a break point at $X_2$ and an end point at $X_{MAX}$.

9. The method according to claim 8, wherein said gradation correction curve comprises the break point is smoothed by an arc.

10. The device according to claim 1, wherein:

the specular cumulative frequency $Y_1$ and the highlight cumulative frequency $Y_2$ are selected such that:

the value $D_1 = \|Y_1 - Y_{MIN}\|$; and the value $D_2 = \|Y_2 - Y_{MIN}\|$;

wherein $Y_{MIN}$ is the cumulative frequency of the image level $X_{MIN}$ corresponding to the lowest density level in the luminous image, and wherein $10^{-5} \leq D_1$, $D_1 \leq (D_2/2)$, and $D_2 \leq 0.1$.

11. The device according to claim 10, wherein:

$D_1 \leq 0.2\%$; and, $D_2 \leq 1.0\%$.

12. A device for detecting and processing a specular image density level $X_1$ and a highlight image density level $X_2$ in a reproduction of an illuminated scene comprising:

means for exposing a photo-sensitive means by a luminous image from said scene, thereby generating a plurality of digital image signals, each said digital image signal representing a density of a portion of said luminous image;

means for establishing a cumulative histogram for the image density levels of said digital image signals;

means for providing a reference specular cumulative frequency $Y_1$;

means for providing a reference highlight cumulative frequency $Y_2$;

means for converting said specular cumulative frequency $Y_1$ via said cumulative histogram, to obtain said specular image density level $X_1$;

means for converting said highlight cumulative frequency $Y_2$ via said cumulative histogram, to obtain said highlight image density level $X_2$; and means for indicating a presence of specular reflections when a ratio $\alpha = \|X_{MAX} - X_2\| / \|X_{MAX} - X_1\|$ is smaller than a predetermined value, wherein $X_{MAX}$ is an image density level greater than or equal to a highest density level within said luminous image.

13. The device according to claim 12, wherein said predetermined value is 0.875.

14. The device according to claim 12, further comprising means for optimizing an exposure time for exposing said photo-sensitive means based on the image density level of $X_1$, $X_2$ or a combination thereof.

15. The device according to claim 14, wherein said exposure time is selected to move either $X_2$ or $X_1$ to an extreme image level.

16. The device according to claim 12, wherein said image signals are further transformed by a gradation correction curve.

17. The device according to claim 16, wherein said gradation correction curve comprises linear segments, having a start point at $X_1$, a break point at $X_2$ and an end point at $X_{MAX}$.

18. The method according to claim 17, wherein said gradation correction curve comprises the break point is smoothed by an arc.

* * * * *